(12) United States Patent
Ueda (10) Patent No.: US 9,697,860 B2
(45) Date of Patent: Jul. 4, 2017

(54) MAGNETIC-DISK GLASS SUBSTRATE, MAGNETIC DISK AND METHOD FOR MANUFACTURING MAGNETIC-DISK GLASS SUBSTRATE (71) Applicant: Masaaki Ueda, Tokyo (JP)

(72) Inventor: Masaaki Ueda, Tokyo (JP)

(73) Assignee: HOYA CORPORATION, Tokyo (JP)

(*) Notice: Subject to any disclaimer, the term of this patent is extended or adjusted under 35 U.S.C. 154(b) by 0 days.

(21) Appl. No.: 14/432,172

(22) PCT Filed: Jun. 28, 2013

(86) PCT No.: PCT/JP2013/067940
§ 371 (c)(1),
(2) Date: Mar. 27, 2015

(87) PCT Pub. No.: WO2014/050241
PCT Pub. Date: Apr. 3, 2014

(65) Prior Publication Data
US 2015/0255103 A1 Sep. 10, 2015

(30) Foreign Application Priority Data

Sep. 28, 2012 (JP) ................................ 2012-218412

(51) Int. Cl.
G11B 5/73 (2006.01)
G11B 5/82 (2006.01)
(Continued)

(52) U.S. Cl.
CPC ............ *G11B 5/7315* (2013.01); *B24B 37/08* (2013.01); *G11B 5/73* (2013.01); *G11B 5/82* (2013.01);
(Continued)

(58) Field of Classification Search
None
See application file for complete search history.

(56) References Cited

U.S. PATENT DOCUMENTS 5,388,020 A * 2/1995 Nakamura ........... G11B 5/6005
360/135
5,604,014 A 2/1997 Onodera
(Continued)

FOREIGN PATENT DOCUMENTS

JP H08-7264 A 1/1996
JP 2000-132829 A 5/2000
(Continued)

OTHER PUBLICATIONS

International Search Report in PCT/JP2013/067940 dated Sep. 24, 2013.
(Continued)

*Primary Examiner* — Kevin Bernatz
(74) *Attorney, Agent, or Firm* — Global IP Counselors, LLP (57) ABSTRACT A magnetic-disk glass substrate of the present invention includes a pair of main surfaces, a side wall surface, and a chamfered surface between the main surfaces and the side wall surface. Regarding surface properties of at least one of the side wall surface and the chamfered surface of the glass substrate, an arithmetic average roughness (Ra) is 0.015 μm or less, and a bearing factor of a roughness cross-sectional area when a roughness percentage is 60% is 95% or more in a bearing curve of a roughness cross-sectional area.

19 Claims, 4 Drawing Sheets (51) Int. Cl.
    *G11B 5/84*     (2006.01)
    *B24B 37/08*    (2012.01)
(52) U.S. Cl.
    CPC ........ *G11B 5/8404* (2013.01); *C03C 2204/08* (2013.01)

(56) References Cited

U.S. PATENT DOCUMENTS

| | | | |
|---|---|---|---|
| 6,280,294 B1 | 8/2001 | Miyamoto | |
| 6,383,404 B1* | 5/2002 | Sakai | B82Y 15/00 |
| | | | 216/97 |
| 6,509,111 B1* | 1/2003 | Shoda | G11B 5/7325 |
| | | | 360/131 |
| 6,706,427 B2* | 3/2004 | Yokoyama | B32B 17/10981 |
| | | | 428/846.9 |
| 8,734,967 B2* | 5/2014 | Kitsunai | G11B 5/7315 |
| | | | 360/135 |
| 9,186,771 B2 | 11/2015 | Sakai et al. | |
| 2001/0053444 A1* | 12/2001 | Yokoyama | B32B 17/10981 |
| | | | 428/410 |
| 2002/0142191 A1 | 10/2002 | Sakai et al. | |
| 2002/0197437 A1* | 12/2002 | Hashimoto | C03C 19/00 |
| | | | 428/848.2 |
| 2003/0215672 A1* | 11/2003 | Shoda | G11B 5/64 |
| | | | 428/831.2 |
| 2005/0052987 A1* | 3/2005 | Sonoda | G11B 5/64 |
| | | | 369/283 |
| 2007/0196699 A1* | 8/2007 | Aida | B24B 1/00 |
| | | | 428/846.1 |
| 2008/0028793 A1* | 2/2008 | Aida | C03C 19/00 |
| | | | 65/61 |
| 2008/0052987 A1* | 3/2008 | Busch | A01G 31/06 |
| | | | 47/62 R |
| 2008/0224270 A1* | 9/2008 | Ikubo | H01L 21/0206 |
| | | | 257/618 |
| 2009/0226767 A1* | 9/2009 | Fukushima | G11B 5/7315 |
| | | | 428/848.2 |
| 2014/0329174 A1* | 11/2014 | Hamamoto | G03F 1/22 |
| | | | 430/5 |
| 2016/0372147 A1* | 12/2016 | Azuma | C03C 15/00 |

FOREIGN PATENT DOCUMENTS

| | | |
|---|---|---|
| JP | 2001-243617 A | 9/2001 |
| JP | 2005-220018 A | 8/2005 |
| JP | 2006-236561 A | 9/2006 |
| JP | 2007-42263 A | 2/2007 |
| JP | 2007-272995 A | 10/2007 |
| JP | 2009-093744 A | 4/2009 |
| JP | 2012-216278 A | 11/2012 |

OTHER PUBLICATIONS

Office Action dated Jan. 17, 2017 in the counterpart Japanese patent application.

* cited by examiner

BEARING CURVE OF ROUGHNESS CROSS-SECTIONAL AREA

BEARING CURVE OF ROUGHNESS CROSS-SECTIONAL AREA

MAGNETIC-DISK GLASS SUBSTRATE, MAGNETIC DISK AND METHOD FOR MANUFACTURING MAGNETIC-DISK GLASS SUBSTRATE

CROSS-REFERENCE TO RELATED APPLICATIONS

This U.S. National stage application of International Patent Application No. PCT/JP2013/067940, filed Jun. 28, 2013, which, in turn, claims priority under 35 U.S.C. §119 (a) to Japanese Patent Application No. 2012-218412, filed in Japan on Sep. 28, 2012, the entire contents of which are hereby incorporated herein by reference.

BACKGROUND

Field of the Invention

The present invention relates to a magnetic-disk glass substrate, a magnetic disk and a method for manufacturing a magnetic-disk glass substrate.

Background Information

Nowadays, personal computers, digital versatile disc (DVD) recorders, and the like have a built-in hard disk drive (HDD) for data recording. In particular, a magnetic disk in which a magnetic layer is provided on a glass substrate is used in a hard disk drive that is used in a device premised on portability, such as a notebook-type personal computer, and magnetic recording information is recorded on or read from the magnetic layer with a magnetic head that flies slightly above the surface of the magnetic disk. A glass substrate is unlikely to be plastically deformed compared with a metal substrate (aluminum substrate) and the like, and thus is preferably used as a substrate of the magnetic disk.

Moreover, the density of magnetic recording has been increased to meet the demand for an increase in the storage capacity of hard disk drives. For example, the magnetic recording information area (recording bit) has been made smaller using a perpendicular magnetic recording system that causes the direction of magnetization in the magnetic layer to be perpendicular to the surface of the substrate. This makes it possible to increase the storage capacity per disk substrate. Also, in order to further increase the storage capacity, the distance between the recording and reproducing element and the magnetic recording layer is made very short by causing the element of the magnetic head to project farther, thus further improving the accuracy of the recording and reproducing of information (improve the S/N ratio). It should be noted that such control of the recording and reproducing element of the magnetic head is called a dynamic flying height (DFH) control mechanism and a magnetic head equipped with this control mechanism is called a DFH head. A magnetic-disk glass substrate that is used in an HDD in combination with such a DFH head is produced so as to have an extremely smooth main surface in order to prevent the substrate from colliding or coming into contact with the magnetic head and the recording and reproducing element that projects farther therefrom.

A magnetic-disk glass substrate includes a pair of main surfaces, side wall surfaces, and chamfered surfaces between the main surfaces and the side wall surfaces. Conventionally, it has been known that it is possible to prevent the generation of particles due to rubbing against a spindle inside an HDD and to suppress problems such as head crash and thermal asperity by forming the side wall surfaces and/or the chamfered surfaces of the magnetic-disk substrate to have surface roughness that is smaller than or equal to a predetermined value or by forming the side wall surfaces and/or the chamfered surfaces to have a desired shape. For example, JP 2006-236561A states that the side wall surfaces and the chamfered surfaces are formed to have surface roughness of 1 μm or less in Rmax, and that a curved surface having a radius of 0.003 mm or more to less than 0.2 mm is interposed at least one of between the side wall surfaces and chamfered surfaces of the glass substrate and between the main surfaces and chamfered surfaces of the glass substrate.

SUMMARY

When a magnetic layer was formed on the glass substrate to produce a magnetic disk, problems such as head crash and thermal asperity sometimes occurred during prolonged LUL endurance testing using a magnetic head, despite the surface roughness of the main surfaces of the magnetic-disk glass substrate being made sufficiently small.

Therefore, it is an object of the present invention to provide a magnetic-disk glass substrate, a magnetic disk, and a method for manufacturing a magnetic-disk glass substrate in which problems such as head crash and thermal asperity are unlikely to occur.

As a result of intensive research by the inventors of the present invention to find out the causes for problems such as head crash and thermal asperity occurring even though the surface roughness of the main surface was made sufficiently small, it was found that foreign matter was attached to the main surface of the glass substrate in which the problems occurred. This foreign matter was colloidal silica microparticles, and investigating the source thereof revealed that the foreign matter was also attached to the side wall surfaces and/or the chamfered surfaces on the outer circumferential surface and the inner circumferential surface of the glass substrate. From these facts, it was inferred that the foreign matter was residual colloidal silica abrasive particles used in mirror finish polishing that were left on the glass substrate.

The inventors of the present invention think that the reason why the colloidal silica microparticles may attach to the main surface is as follows.

Even in the case where the surface roughness of the side wall surfaces and/or the chamfered surfaces on the outer circumferential surface and the inner circumferential surface of the glass substrate is made sufficiently small, minute groove shapes and minute hole shapes exist in the surfaces. When a large number of these grooves or holes are relatively deep (deep grooves), the colloidal silica microparticles enter the deep grooves, and thus attach to the side wall surfaces and/or the chamfered surfaces. In other words, the colloidal silica microparticles are trapped in the deep grooves. In particular, in the case where the glass substrate is held by a carrier and is polished in main surface polishing using colloidal silica abrasive particles, it is thought that the colloidal silica abrasive particles enter the gap between the glass substrate and the carrier during polishing, and further enter the deep grooves on the side wall surfaces and/or the chamfered surfaces. Colloidal silica microparticles used as abrasive particles conventionally had a size of about 50 nm, but in recent years have a size of 20 nm or less, and thus are more likely to enter the deep grooves. Colloidal silica microparticles that have attached to the side wall surfaces and/or the chamfered surfaces in this manner are sometimes not removed by cleaning the glass substrate after the final polishing. It is thought that colloidal silica microparticles that attached to the side wall surfaces and/or the chamfered surfaces move from the side wall surfaces and/or the chamfered surfaces and attach to the main surface in a step after the final polishing, that is, in a step of manufacturing the magnetic-disk glass substrate (e.g., inspection and packing) or a step of manufacturing the magnetic disk. In the case where the colloidal silica microparticles move and attach to the main surface, a magnetic layer is formed on the microparticles to form fine unevenness on the surface of the magnetic layer. This fine unevenness causes problems such as head crash and thermal asperity. Since DFH mechanisms have been mounted in magnetic heads following increases in the recording density of magnetic disks in recent years, the gap between the surface of the magnetic disk and the element portion of the magnetic head has been significantly reduced (for example, 2 nm or less). Thus, the above-described problems are likely to occur when microparticles remain on the main surface of the magnetic disk, even though these microparticles are smaller than conventional microparticles.

Here, it is thought that the possibility of more colloidal silica microparticles attaching to the side wall surfaces and/or the chamfered surfaces increases as the number of deep grooves formed on the side wall surfaces and/or the chamfered surfaces of a glass substrate increases. Since indices that have conventionally been used to indicate the surface roughness of a glass substrate (e.g., Ra and Rmax) do not reflect the number of such deep grooves, it is thought that a large number of colloidal silica microparticles may remain on the glass substrate, even in the case where the surface roughness of the side wall surfaces and/or the chamfered surfaces of the glass substrate appears to have been made sufficiently small based on the conventional indices.

In view of the foregoing problems, the inventors of the present invention devised surface properties that make it unlikely that fine polishing abrasive particles such as colloidal silica microparticles will remain on the side wall surfaces or the chamfered surfaces of a glass substrate, and found that it was possible to suppress problems such as head crash and thermal asperity with those properties, allowing the present invention to be achieved.

That is, a first aspect of the present invention is a doughnut-shaped magnetic-disk glass substrate comprising a pair of main surfaces, a side wall surface, and a chamfered surface between the main surfaces and the side wall surface, wherein regarding surface properties of at least one of the side wall surface and the chamfered surface, an arithmetic average roughness (Ra) is 0.015 μm or less, and a bearing factor of a roughness cross-sectional area is 95% or more when a roughness percentage is 60% in a bearing curve of a roughness cross-sectional area.

In the magnetic-disk substrate, it is preferable that regarding surface properties of at least one of the side wall surface and the chamfered surface, an amount of change in the roughness percentage is 25% or less when the bearing factor of the roughness cross-sectional area increases from 20% to 80% in the bearing curve of the roughness cross-sectional area.

In the magnetic-disk substrate, it is preferable that regarding surface properties of at least one of the side wall surface and the chamfered surface, a maximum height (Rz) is 0.15 μm or less.

In the magnetic-disk substrate, it is preferable that the arithmetic average roughness (Ra) and/or the maximum height (Rz) and the bearing curve of a roughness cross-sectional area are measured in a region having a predetermined size on the side wall surface and/or the chamfered surface.

In the magnetic-disk substrate, it is preferable that at least one of the side wall surface and the chamfered surface is on the outer circumferential side of the glass substrate, and it is more preferable that the side wall surface is on the outer circumferential side of the glass substrate.

A second aspect of the present invention is a magnetic disk in which at least a magnetic recording layer is formed on the surface of the above-described magnetic-disk glass substrate.

A third aspect of the present invention is a method for manufacturing a magnetic-disk glass substrate comprising polishing processing in which a polishing liquid containing polishing abrasive particles is used to perform main surface polishing on a doughnut-shaped glass substrate including a pair of main surfaces, a side wall surface, and a chamfered surface between the main surfaces and the side wall surfaces, wherein regarding surface properties of at least one of the side wall surface and the chamfered surface of the glass substrate, an arithmetic average roughness (Ra) is 0.015 μm or less, and a bearing factor of a roughness cross-sectional area is 95% or more when a roughness percentage is 60% in a bearing curve of a roughness cross-sectional area.

With the magnetic-disk glass substrate, the magnetic disk, and the method for manufacturing a magnetic-disk glass substrate described above, it is possible to make problems such as head crash and thermal asperity unlikely to occur.

DESCRIPTION OF EMBODIMENTS

Hereinafter, a method for manufacturing a magnetic-glass substrate of this embodiment will be described in detail.

[Magnetic-Disk Glass Substrate]

Aluminosilicate glass, soda-lime glass, borosilicate glass, or the like can be used as a material for the magnetic-disk glass substrate of this embodiment. In particular, aluminosilicate glass can be preferably used in that it can be chemically strengthened and a magnetic-disk glass substrate having excellent flatness of its main surface and excellent strength of the substrate can be produced.

Although there is no limitation on the composition of the magnetic-disk glass substrate of this embodiment, the glass substrate of this embodiment is aluminosilicate glass that preferably contains, in terms of oxide amount in mol %, $SiO_2$ in an amount of 50 to 75%, $Al_2O_3$ in an amount of 1 to 15%, at least one component selected from $Li_2O$, $Na_2O$ and $K_2O$ in a total amount of 5 to 35%, at least one component selected from MgO, CaO, SrO, BaO and ZnO in a total amount of 0 to 20%, and at least one component selected from $ZrO_2$, $TiO_2$, $La_2O_3$, $Y_2O_3$, $Ta_2O_5$, $Nb_2O_5$ and $HfO_2$ in a total amount of 0 to 10%.

Also, the glass substrate of this embodiment may be amorphous aluminosilicate glass that preferably contains, as disclosed in JP 2009-99239A for example, in mass %, $SiO_2$ in an amount of 57 to 75%, $Al_2O_3$ in an amount of 5 to 20% (it should be noted that the total amount of $SiO_2$ and $Al_2O_3$ is 74% or more), $ZrO_2$, $HfO_2$, $Nb_2O_5$, $Ta_2O_5$, $La_2O_3$, $Y_2O_3$ and $TiO_2$ in a total amount of more than 0% to 6% or less, $Li_2O$ in an amount of more than 1% to 9% or less, $Na_2O$ in an amount of 5 to 18% (it should be noted that a mass ratio $Li_2O/Na_2O$ is 0.5 or less), $K_2O$ in an amount of 0 to 6%, MgO in an amount of 0 to 4%, CaO in an amount of more than 0% to 5% or less (it should be noted that the total amount of MgO and CaO is 5% or less and the content of CaO is larger than that of MgO), and SrO+BaO in an amount of 0 to 3%.

Heat-resistant glass having a Tg of 650° C. may also be used in the glass substrate of this embodiment. It is possible to form a magnetic film for an energy-assisted magnetic recording system on such a glass substrate, and thus to achieve an even higher recording density.

It should be noted that it is more preferable to use amorphous aluminosilicate glass as the above-described glass. This is because amorphous aluminosilicate glass is not glass including crystal structures as crystalized glass and has a uniform structure, thus making it possible to form extremely smooth surfaces.

Figure 1A:
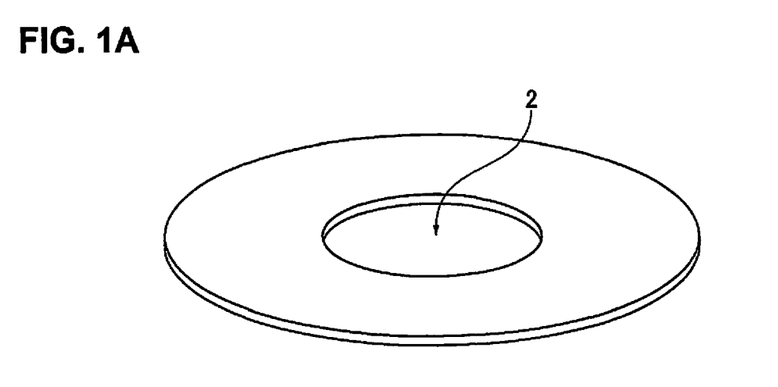
FIG. 1A is a drawing illustrating an external shape of a magnetic-disk glass substrate according to an embodiment.
Figure 1B:
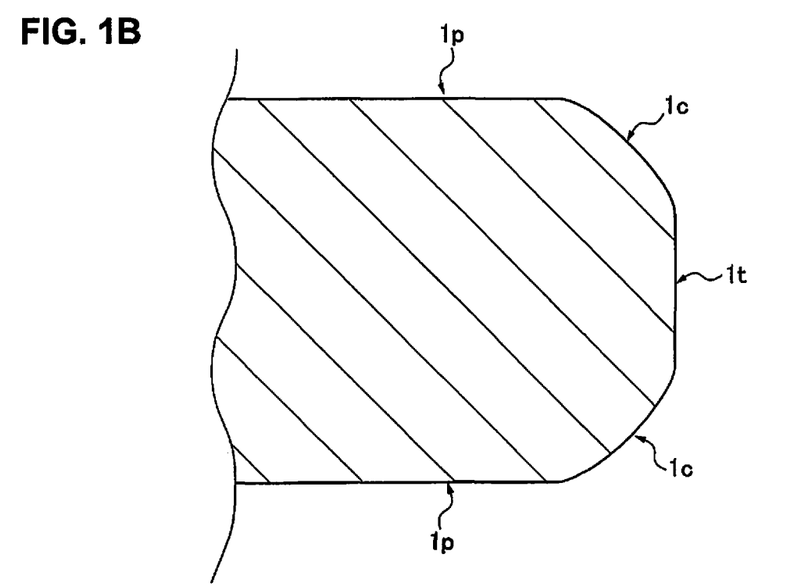
FIG. 1B is an enlarged cross-sectional view of an end portion on the outer circumferential side of the magnetic-disk glass substrate according to the embodiment.

FIGS. 1A and 1B show an external shape of the magnetic-disk glass substrate of this embodiment. As shown in FIG. 1A, a thin glass substrate that has a doughnut shape with an inner hole 2 formed therein is used as the magnetic-disk glass substrate of this embodiment. Although there is no limitation on the size of the magnetic-disk glass substrate, the magnetic-disk glass substrate is preferably, for example, for a magnetic-disk glass substrate with a nominal diameter of 2.5 inches.

FIG. 1B is an enlarged cross-sectional view of an end portion on the outer circumferential side of the magnetic-disk glass substrate of this embodiment. As shown in FIG. 1B, the magnetic-disk glass substrate has a pair of main surfaces 1p, a side wall surface 1t that is disposed in a direction orthogonal to the pair of main surfaces 1p, and a pair of chamfered surfaces 1c that are disposed between the pair of main surfaces 1p and the side wall surface 1t. A side wall surface and chamfered surfaces, which are not shown in the drawing, are also formed in the end portion on the inner circumferential side of the magnetic-disk glass substrate. It should be noted that the chamfered surfaces may be formed in an arc shape when viewed in cross section.

The magnetic-disk glass substrate of this embodiment has a shape that satisfies at least the following two Requirements 1 and 2 regarding the surface properties of at least one of the side wall surface and the chamfered surface.

(Requirement 1) The arithmetic average roughness (Ra) is 0.015 μm or less.

Figure 2:
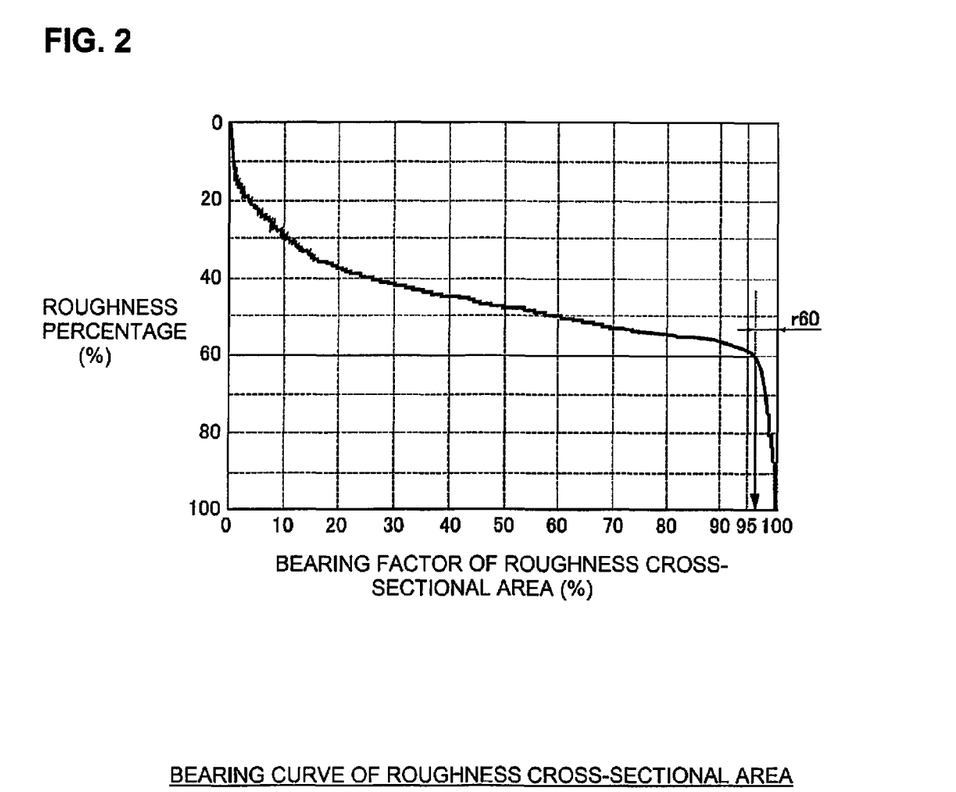
FIG. 2 is a drawing illustrating a bearing curve of a roughness cross-sectional area of the magnetic-disk glass substrate according to the embodiment.

(Requirement 2) In a bearing curve of a roughness cross-sectional area, the bearing factor of a roughness cross-sectional area is 95% or more when the roughness percentage is 60% (see FIG. 2).

FIG. 2 is a bearing curve of a roughness cross-sectional area of the side wall surfaces and/or the chamfered surfaces, which illustrates the above Requirement 2.

Here, when in a target surface (or measurement data of a surface shape), the surface is assumed to be cut at certain height by a plane parallel to the surface, a value representing a level of the cutting height (cutting level) as a percentage when maximum height is set to 0% and minimum height is set to 100% is given as "roughness percentage". "Bearing factor of roughness cross-sectional area" refers to a value representing, as a percentage, a ratio of the sectional area when the surface is cut at a certain cutting level to the area of the region where the surface exists (that is, the area of the region where the surface exists when viewed from the direction orthogonal to the section, not the surface area of that surface). "Bearing curve of roughness cross-sectional area" refers to a relationship between the roughness percentage and the bearing factor of a roughness cross-sectional area in a target surface when the vertical axis indicates the roughness percentage and the horizontal axis indicates the bearing factor of a roughness cross-sectional area.

In the case where the side wall surfaces and/or the chamfered surfaces have an arithmetic average roughness (Ra) of greater than 0.015 μm, foreign matter tends to attach to the surfaces by being trapped by the surface roughness, and therefore Requirement 1 is provided.

Figure 3:
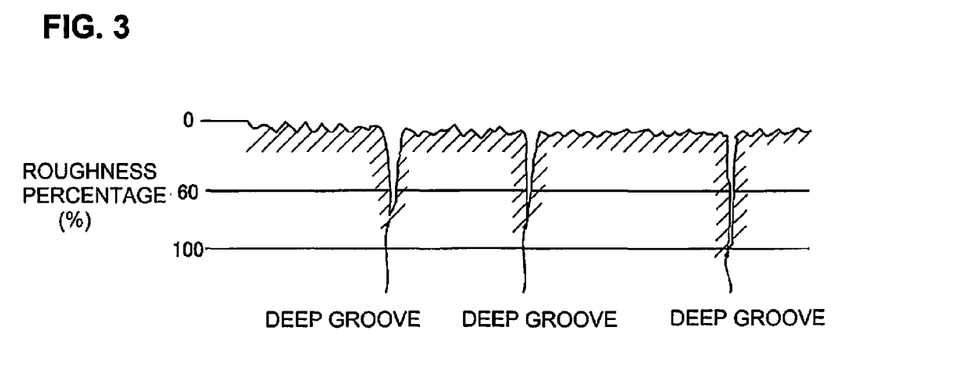
FIG. 3 is a drawing illustrating an example of a cross-sectional shape of a side wall surface or a chamfered surface of the magnetic-disk glass substrate according to the embodiment.

The reason why Requirement 2 is provided will be described with reference to FIGS. 2 and 3. FIG. 3 is a drawing illustrating an example of a minute region of a section of the glass substrate corresponding to the side wall surface and/or the chamfered surfaces. In the drawing, the roughness percentage is indicated in the vertical direction of the page. Here, as shown in FIG. 3, regarding the surface properties of the side wall surfaces and/or the chamfered surfaces, a groove (recessed portion) whose roughness percentage is greater than 60% is referred to as "deep groove". Although such a deep groove is significantly small and narrow, when the main surface is polished using microparticles of colloidal silica or the like during the production of a glass substrate, the microparticles may enter the deep grooves and remain on the side wall surfaces and/or the chamfered surfaces. The microparticles that have entered the deep grooves move and attach (are re-released) to the main surface, and thus can cause problems such as head crash and thermal asperity. Therefore, regarding the surface properties of the side wall surfaces and/or the chamfered surfaces, it is preferable that the number of the deep grooves is small in order to reduce the number of colloidal silica microparticles that remain on the side wall surfaces and/or the chamfered surfaces as much as possible. From such a viewpoint, in a bearing curve of a roughness cross-sectional area, the bearing factor of a roughness cross-sectional area is set to 95% or more when the roughness percentage is 60%. Thus, the number of deep grooves (that is, grooves having a roughness percentage of 60% or more) is significantly reduced (the bearing factor becomes less than 5% of the whole). When a value obtained by subtracting the bearing factor (%) of the roughness cross-sectional area when the roughness percentage is 60% from 100(%) is given as r60 in the bearing curve of a roughness cross-sectional area shown in FIG. 2, it is thought that the value of r60 is highly correlated with the number of deep grooves formed on the side wall surfaces and/or the chamfered surfaces.

In particular, in the case where the glass substrate is attached to a carrier when the main surface is polished using microparticles of colloidal silica or the like, the microparticles enter the gap between the end portion on the outer circumferential side of the glass substrate and the carrier. Therefore, when deep grooves are formed on the side wall surface and/or the chamfered surfaces, the microparticles of colloidal silica or the like are likely to be trapped by the deep grooves. Accordingly, it is preferable that the side wall surface and/or the chamfered surfaces on the outer circumferential side of the glass substrate, out of the side wall surfaces and/or the chamfered surfaces on the outer and the inner circumferential sides, satisfies the above Requirement 2. Moreover, the side wall surface, out of the side wall surface and the chamfered surfaces on the outer circumferential side of the glass substrate, comes into contact with the inner circumferential surface of the carrier during polishing of the main surface, and the microparticles of colloidal silica or the like are thereby pressed against the side wall surface on the outer circumferential side of the glass substrate. Thus, the side wall surface acts such that the deep grooves on the side wall surface on the outer circumferential side are filled with the microparticles. Accordingly, in order to make such action unlikely to occur, it is more preferable that in particular, the side wall surface, out of the side wall surface and the chamfered surfaces on the outer circumferential side of the glass substrate, satisfies the above Requirement 2.

It should be noted that it is preferable that the surface properties of at least one of the side wall surface and the chamfered surface of the magnetic-disk glass substrate of this embodiment satisfies the following Requirement 3.

Figure 4:
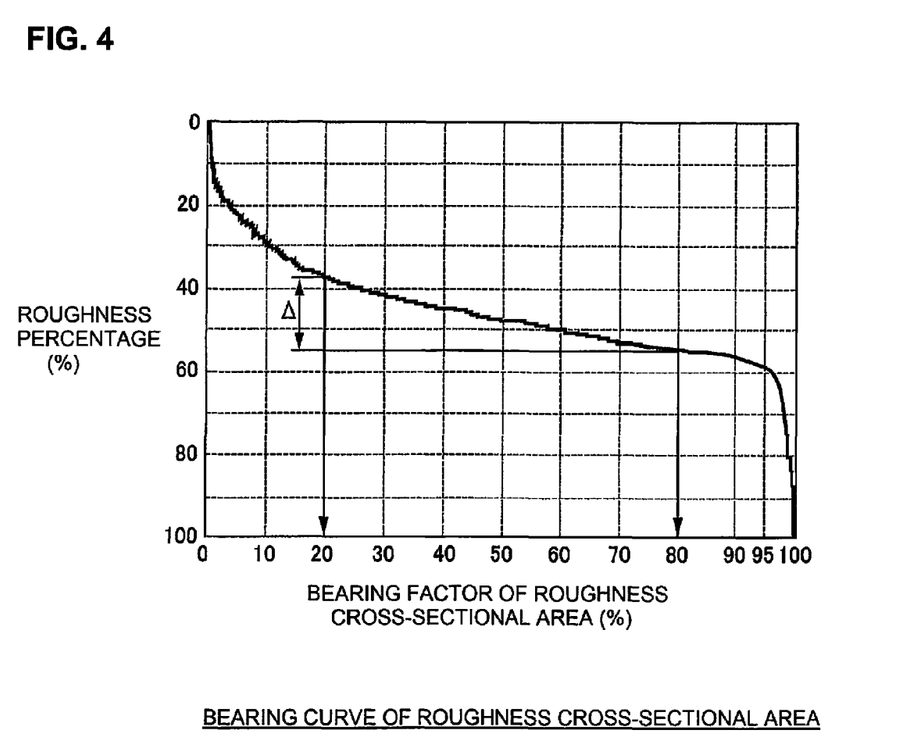
FIG. 4 is a drawing illustrating a bearing curve of a roughness cross-sectional area of the magnetic-disk glass substrate according to the embodiment.

(Requirement 3) In a bearing curve of a roughness cross-sectional area, the amount of change in the roughness percentage is 25% or less when the bearing factor of a roughness cross-sectional area increases from 20% to 80% (see FIG. 4).

FIG. 4 is a bearing curve of a roughness cross-sectional area of the side wall surfaces and/or the chamfered surfaces, which illustrates the above Requirement 3.

The reason why it is more preferable to satisfy Requirement 3 is as follows. As long as the above Requirement 2 is satisfied, a region having the bearing factor of a roughness cross-sectional area within a range of 20 to 80% includes no deep grooves regarding the surface properties of the glass substrate. By satisfying Requirement 3, this region has surface properties in which relatively shallow grooves are formed more uniformly, thus making it possible to reduce a possibility that the colloidal silica microparitcles enter or attach to a region other than deep grooves.

It should be noted that in the above-described magnetic-disk glass substrate, it is preferable to measure the arithmetic average roughness (Ra) and the bearing curve of a roughness cross-sectional area (surface roughness) in a region with a predetermined size on the side wall surfaces and/or the chamfered surfaces. This is because streaky grooves (or scratches) may exist on the side wall surfaces and/or the chamfered surfaces of the magnetic-disk glass substrate, and when the arithmetic average roughness (Ra) and the bearing curve of a roughness cross-sectional area are measured as line roughness, the measurement results may not reflect the above-described streaky grooves depending on the measurement direction.

Moreover, the magnetic-disk glass substrate of this embodiment has a maximum height (Rz) of 0.15 µm or less regarding the surface properties of at least one of the side wall surface and the chamfered surface. By setting the maximum height (Rz) to 0.15 µm or less, grooves formed on the side wall surfaces or the chamfered surfaces becomes shallower, and thus the colloidal silica microparticles are unlikely to attach to (or remain on) the surfaces.

[Method for Manufacturing Magnetic-Disk Glass Substrate]

Hereinafter, a method for manufacturing a magnetic-disk glass substrate of this embodiment will be described for each series of processing. It should be noted that the processing order may be changed as appropriate.

(1) Plate Glass Molding and Rough Grinding Processing

After forming a sheet of plate glass by, for example, a float method, a raw glass plate having a predetermined shape from which a magnetic-disk glass substrate is to be made is cut out from this sheet of plate glass. A raw glass plate may also be molded by, for example, pressing using an upper mold and a lower mold instead of a float method. It should be noted that a method for manufacturing a raw glass plate is not limited to these methods and a raw glass plate can also be manufactured by a known manufacturing method such as a down draw method, a redraw method or a fusion method.

It should be noted that rough grinding processing using loose abrasive particles may be performed on two main surfaces of the raw glass plate as needed.

(2) Inner Hole Forming Processing

An inner hole is formed in the center of the disc-shaped glass material using a cylindrical diamond drill, and thus an annular glass substrate is obtained.

(3) Shaping Processing

After the inner hole forming processing, shaping processing for forming chamfered surfaces at the end portions (outer circumferential end portion and inner circumferential end portion) is performed. In the shaping processing, first, the outer circumferential end portion and the inner circumferential portion of the annular glass substrate are ground using a 400# electrodeposition diamond grindstone or the like, and thus a chamfered shape is formed at a relatively high speed. Next, the chamfered surfaces are polished using a grindstone that has a low polishing rate and does not damage the surfaces of the end portions, such as a 2000# resin bond diamond grindstone, so as to have surface properties approaching a mirror surface.

(4) End Surface Polishing Processing

Next, end surface polishing (edge polishing) is performed on the annular glass substrate.

In the end surface polishing, a mass of a magnetic slurry is formed by holding the magnetic slurry in magnetic field lines, and this mass and the inner circumferential end surface and the outer circumferential end surface of the glass substrate are brought into contact and moved relative to each other, and thus the inner circumferential end surface and the outer circumferential end surface of the glass substrate are polished. The side wall surfaces and the chamfered surfaces can be polished simultaneously. It should be noted that the machining allowance in the end surface polishing processing is, for example, about 1 to 5 µm. A magnetic viscous fluid and microparticles of cerium oxide, zirconium oxide, or the like as polishing abrasive particles are used in the magnetic slurry. A fluid including, for example, a surfactant and non-polar oil containing magnetic microparticles constituted by Fe with a size of 0.1 to 10 µm in an amount of 3 to 5 g/cm$^3$ is used as the magnetic viscous fluid. Non-polar oil or polar oil has a viscosity of 1 to 20 (Pa·second) in a non-magnetized state at room temperature (20° C.), for example. By polishing the end surfaces, contamination by attached waste and the like, and damage or impairment such as scratches on the end surfaces of the glass substrate are eliminated, and therefore, it is possible to prevent thermal asperity and the deposition of ions such as sodium and potassium that causes corrosion. With the end surface polishing of this embodiment, extremely precise and highquality processing is enabled compared with a conventional method for polishing end surfaces using a brush. Specifically, it is possible to significantly reduce surface roughness and waviness as well, and to reduce the likelihood of deep grooves being formed on the surfaces.

Here, the end surface polishing will be described in detail. FIGS. 5A to 5C and FIG. 6 are drawings illustrating an example of a polishing method in the end surface polishing of this embodiment.

Figure 5A:
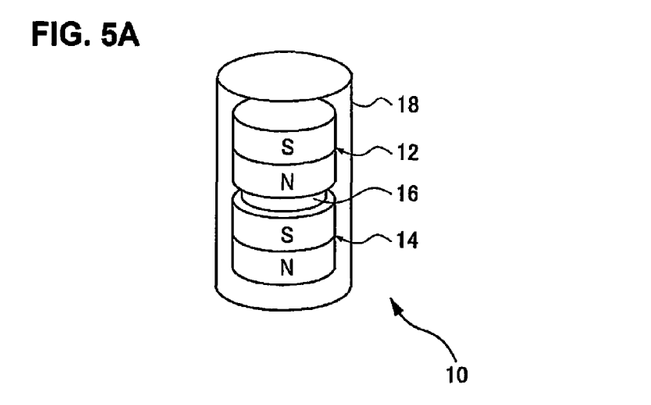
FIG. 5A is a drawing illustrating a method for polishing a glass substrate according to an embodiment.
Figure 5C:
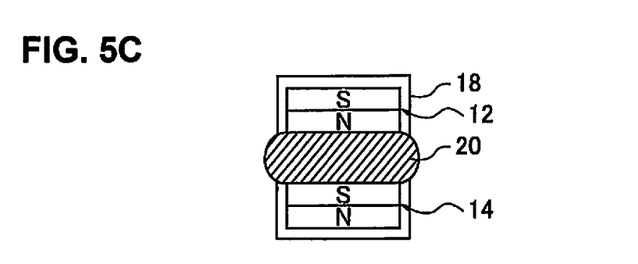
FIG. 5C is a drawing illustrating the method for polishing a glass substrate according to the embodiment.
Figure 6:
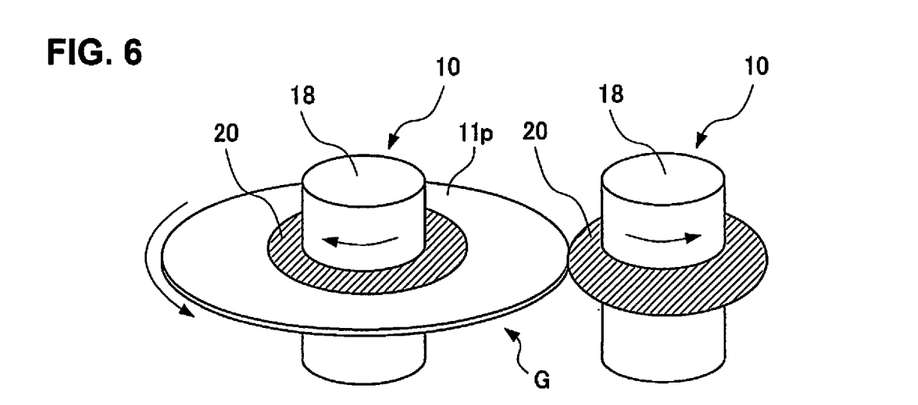
FIG. 6 is a drawing illustrating the method for polishing a glass substrate according to the embodiment.

An end surface polishing device 10 polishes the end surfaces of a glass substrate using a means for generating magnetism and a magnetic slurry. An outline of the end surface polishing device 10 will be described. As shown in FIG. 5A, the device 10 includes a pair of magnets 12 and 14, which are permanent magnets, a spacer 16, and a cylindrical pipe 18 made of a non-magnetic substance such as stainless steel. The magnets 12 and 14 and the spacer 16 are incorporated in the pipe 18. A glass substrate whose end surfaces are to be polished is held by a holder (not shown). The pipe 18 is passed through an inner hole of the glass substrate held by the holder, and a mass 20 of magnetic slurry, which will be described later (see FIGS. 5C and 6), and the inner circumferential end surface of the glass substrate are brought into contact with each other. As shown in FIG. 6, a pipe 18 may also be disposed near the outer circumferential end surface of the glass substrate. The mass 20 formed by the magnets 12 and 14 in this pipe 18 and the outer circumferential end surface of the glass substrate are moved relative to each other in a state in which they are in contact, and thus the outer circumferential end surface of the glass substrate is polished. The holder (not shown) for holding the pipe 18 of the device 10 and the glass substrate are mechanically connected to a driving motor (not shown). By rotating the pipes 18 and the holders at, for example, 500 to 2000 rpm, to move the end surface of the glass substrate and the mass 20 relative to each other, it is possible to polish the inner circumferential end surface and the outer circumferential end surface of the glass substrate. It should be noted that the end surfaces of the glass substrate and the mass 20 may be moved relative to each other by fixing the pipes 18 and the holders and rotating only the glass substrate.

It should be noted that FIG. 6 shows the case where the inner circumferential end surface and the outer circumferential end surface of the glass substrate are simultaneously polished, but there is no limitation to such a case. The inner circumferential end surface and the outer circumferential end surface of the glass substrate may be polished separately.

Figure 5B:
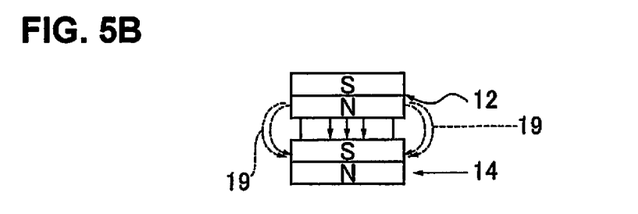
FIG. 5B is a drawing illustrating the method for polishing a glass substrate according to the embodiment.

The end surface polishing will be described more specifically. The magnet 12 and the magnet 14 are close to each other, and serve as a magnetism generating means to form magnetic field lines 19 as shown in FIG. 5B. The magnetic field lines 19 move so as to project outward from the center between the magnets 12 and 14 and also move in the thickness direction of the glass substrate. The spacer 16 made of a non-magnetic substance is provided between the magnets 12 and 14 in order to, for example, form the mass 20 of magnetic slurry as shown in FIG. 5C around the outer circumference of the pipe 18.

Although it is sufficient that a magnetic flux density of the magnetism generating means is set so that the mass 20 of the magnetic slurry is formed, the magnetic flux density is preferably 0.3 to 5 tesla for the purpose of performing end surface polishing efficiently.

It should be noted that in the example shown in FIGS. 5A to 5C and FIG. 6, permanent magnets are used as the magnetism generating means, but electromagnets can also be used. Also, the magnets 12 and 14 can be fixed to the pipe 18 to ensure a constant distance between the end surface on the N-pole side of the magnet 12 and the end surface on the S-pole side of the magnet 14 without the spacer 16.

Known glass substrate polishing abrasive particles such as cerium oxide, colloidal silica, zirconium oxide, alumina abrasive particles, or diamond abrasive particles can be used as the polishing abrasive particles contained in the magnetic slurry. The polishing abrasive particles have a grain diameter of, for example, 0.5 to 3 μm. Using the polishing abrasive particles having a grain diameter within this range makes it possible to favorably polish the inner end surface of the glass substrate. The polishing abrasive particles are contained in the magnetic slurry in an amount of, for example, 1 to 20 vol %.

By performing the end surface polishing processing of this embodiment, regarding the surface properties of the side wall surfaces and/or the chamfered surfaces of the glass substrate, the arithmetic average roughness (Ra) can be set to 0.015 μm or less, and the bearing factor of a roughness cross-sectional area can be set to 95% or more when the roughness percentage is 60% in the bearing curve of a roughness cross-sectional area.

(5) Precision Grinding Processing

In precision grinding processing, the main surfaces of the annular glass substrate are ground using a double-side grinding device provided with a planetary gear mechanism. For example, a grinding pad in which diamond abrasive particles are fixed by a binding agent such as resin bond can be used as fixed abrasive particles to be used in the precision grinding processing. The double-side grinding device has a pair of upper and lower surface plates (upper surface plate and lower surface plate) and the annular glass substrate that is mounted to the carrier is held between the upper surface plate and the lower surface plate. The glass substrate and the surface plates are moved relative to each other by moving one or both of the upper surface plate and the lower surface plate, so that the two main surfaces of the glass substrate can be ground.

(6) First Polishing (Main Surface Polishing) Processing

Next, first polishing is performed on the ground main surfaces of the glass substrate. The first polishing is performed in order to eliminate scratches and distortions that remain on the main surfaces due to the precision grinding and to adjust waviness and minute waviness.

Also, in the first polishing processing, the double-side grinding device provided with a planetary gear mechanism is used. In this polishing device, planar polishing pads having an annular shape as a whole are attached to the upper surface of the lower surface plate and the bottom surface of the upper surface plate, and the polishing pads are pressed against the glass substrate mounted to the carrier, during operation of the planetary gear mechanism. One example of a material for the polishing pad is urethane foam, and urethane foam that has been impregnated with abrasive particles can be favorably used. A polishing liquid containing, for example, cerium oxide or zirconium oxide having an average grain diameter of about 0.1 to 5 μm as the polishing abrasive particles is used in the polishing device. The average grain diameter (D50) means a grain diameter at which the cumulative volume frequency calculated in volume percentage in ascending order from small to large grain diameters reaches 50%.

In the first polishing processing, polishing is performed such that the main surface of the glass substrate has a roughness (Ra) of 0.5 nm or less and a micro-waviness (MW-Rq) of 0.5 nm or less in terms of the surface unevenness. Here, the micro-waviness can be expressed as an RMS (Rq) value that is calculated as the roughness in a wavelength bandwidth of 100 to 500 μm on the main surface, and can be measured with an optical surface shape measurement device, for example.

The roughness of the main surface is expressed as the arithmetic average roughness Ra defined by JIS B0601: 2001, and can be measured with an AFM, for example. Herein, the arithmetic average roughness Ra measured with a resolution of 512 by 512 pixels in a measurement area of 1 μm square can be used.

(7) Chemical Strengthening Processing

Next, the glass substrate on which the first polishing has been performed is chemically strengthened.

For example, a liquid of molten mixed salts of potassium nitrate and sodium sulfate can be used as a chemical strengthening liquid.

In this manner, by immersing the glass substrate in the chemical strengthening liquid, lithium ions and sodium ions in the surface layer of the glass substrate are respectively exchanged with sodium ions and potassium ions with a relatively large ion radius in the chemical strengthening liquid, and the glass substrate is strengthened.

(8) Second Polishing (Final Polishing) Processing

Next, second polishing is performed on the glass substrate that has been chemically strengthened and sufficiently cleaned. The second polishing is performed in order to mirror polish the main surface. It is preferable that the machining allowance in the second polishing is 5 μm or less.

In the second polishing, for example, a polishing device similar to the polishing device used in the first polishing can be used. In this case, the second polishing differs from the first polishing in the type and size of loose abrasive particles and the hardness of a resin polisher. For example, a suede-type soft polisher made of polyurethane foam can be used as the resin polisher. In addition, it is preferable that the hardness of the resin polisher is set to be within a range of 70 to 90 in an Asker C hardness.

For example, microparticles of colloidal silica or the like suspended in a slurry are used as the loose abrasive particles to be used in the second polishing. The colloidal silica abrasive particles have an average grain diameter (D50) of, for example, 50 nm or less, and more preferably 20 nm or less. Using the colloidal silica abrasive particles having an average grain diameter of 20 nm or less makes it possible to provide a significantly smooth main surface.

The polished glass substrate is cleaned to provide a magnetic-disk glass substrate.

It should be noted that in the method for manufacturing a magnetic-disk glass substrate according to this embodiment, regarding the surface properties of the side wall surfaces and/or the chamfered surfaces of the glass substrate that have been subjected to the end surface polishing processing in step (4), the arithmetic average roughness (Ra) is 0.015 μm or less, and the bearing factor of a roughness cross-sectional area is 95% or more when the roughness percentage is 60% in the bearing curve of a roughness cross-sectional area. Therefore, even if the colloidal silica to be used in the second polishing processing has an average grain diameter of 20 nm or less, it is possible to prevent the colloidal silica microparticles from entering grooves (or valleys) on the side wall surfaces and/or the chamfered surfaces, and attaching to the side wall surfaces and/or the chamfered surfaces.

[Magnetic Disk]

A magnetic disk can be obtained as follows using the magnetic-disk glass substrate.

A magnetic disk has a configuration in which, for example, at least an attaching layer, a base layer, a magnetic layer (magnetic recording layer), a protecting layer and a lubricant layer are laminated on the main surface of the magnetic-disk glass substrate (referred to as merely "substrate" hereinafter) in this order from the side of the main surface.

For example, the substrate is introduced into a film deposition device that has been evacuated and the layers from the attaching layer to the magnetic layer are sequentially formed on the main surface of the substrate in an Ar atmosphere by a DC magnetron sputtering method. For example, CrTi can be used in the attaching layer and CrRu can be used in the base layer. For example, a CoPt-based alloy can be used as the magnetic layer. Also, a CoPt-based alloy or a FePt-based alloy having an $L_{10}$ ordered structure is formed to be the magnetic layer for thermally assisted magnetic recording. After the film deposition as described above, by forming the protecting layer using $C_2H_4$ by, for example, a CVD method and subsequently performing nitriding processing that introduces nitrogen to the surface, a magnetic recording medium can be formed. Thereafter, by coating the protecting layer with perfluoropolyether (PFPE) by a clip coat method, the lubricant layer can be formed.

A produced magnetic disk is preferably incorporated in a hard disk drive (HDD) serving as a magnetic recording and reproducing device together with a magnetic head equipped with a dynamic flying height (DFH) control mechanism.

Working Examples and Comparative Examples

In order to confirm the effect of the magnetic-disk glass substrate according to this embodiment, 2.5-inch magnetic disks were produced using manufactured glass substrates and LUL endurance testing was performed to check whether or not problems such as head crash and thermal asperity occurred.

The glass composition of the manufactured magnetic-disk glass substrate is as follows.

[Glass Composition]

Amorphous aluminosilicate glass was used that contained, in mass %, $SiO_2$ in an amount of 65.08%, $Al_2O_3$ in an amount of 15.14%, $Li_2O$ in an amount of 3.61%, $Na_2O$ in an amount of 10.68%, $K_2O$ in an amount of 0.35%, MgO in an amount of 0.99%, CaO in an amount of 2.07%, $ZrO_2$ in an amount of 1.98%, and $Fe_2O_3$ in an amount of 0.10%, and that had a glass-transition temperature of 510° C.

Production of Magnetic-Disk Glass Substrates of Working Examples and Comparative Examples The magnetic-disk glass substrates of working examples were produced by performing each series of processing of the above-described manufacturing method in the given order.

Here, the pressing method was used in molding of the raw glass plates in step (1). In the rough grinding processing, alumina-based loose abrasive particles were used.

In the shaping processing in step (3), chamfered surfaces were formed at the outer end portion and the inner end portion of the glass substrate using an electrodeposition diamond grindstone having a grain size of #400 and a resin bond diamond grindstone having a grain size of #2000 in this order.

In the end surface polishing in step (4), end surface polishing using a magnetic slurry was performed using a polishing device shown in FIG. 5. In this case, a polishing slurry obtained by dispersing polishing abrasive particles of cerium oxide in a magnetic fluid obtained by dispersing Fe microparticles in non-polar oil was used to polish the end surfaces of the glass substrate. It should be noted that the different working examples shown in Table 1 were produced by adjusting the machining allowance and processing conditions in the processing in step (4) as appropriate.

In the precision grinding in step (5), grinding was performed using a grinding device in which fixed abrasive particles obtained by fixing diamond abrasive particles with resin bond were attached to the surface of a surface plate.

In the first polishing in step (6), polishing was performed using a polishing device provided with a planetary gear mechanism. A polishing liquid containing cerium oxide abrasive particles was used, and a hard urethane pad was used as the polishing pad.

In the chemical strengthening in step (7), a mixed solution of potassium nitrate and sodium nitrate, or the like was used to perform the chemical strengthening.

The second polishing in step (8) was performed using a polishing device provided with a planetary gear mechanism in the same manner as in the first polishing. A polishing pad with a soft polisher (suede) (polyurethane foam with an Asker C hardness of 75) was used. Colloidal silica (average grain diameter (D50): 30 nm) was used as the loose abrasive particles. It should be noted that checking the grain size distribution revealed that colloidal silica having a grain diameter of 20 nm was included. Thus, a magnetic-disk glass substrate was obtained. The produced magnetic-disk glass substrate was used as a substrate for a magnetic disk with a nominal diameter of 2.5 inches (having an inner diameter of 20 mm, an outer diameter of 65 mm, and a thickness of 0.635 mm). The surface roughness of the main surface measured with an AFM was 0.2 nm or less in Ra.

On the other hand, when the magnetic-disk glass substrates of comparative examples were produced, chamfered surfaces were formed using a 400# electrodeposition diamond grindstone in the shaping processing in step (3). It should be noted that grinding using a 2000# resin bond diamond grindstone was not performed on the comparative examples. Moreover, in the end surface polishing in step (4), the end surfaces of the glass substrate were polished with a polishing brush using cerium oxide as the loose abrasive particles. Furthermore, the different comparative examples were produced by adjusting the machining allowance of the chamfered surfaces and processing conditions in the processing of steps (3) and (4) as appropriate. Each of the above series of processing other than that of steps (3) and (4) was performed in the same manner as in the working examples.

The surface roughness of the chamfered surfaces and the side wall surfaces of the working examples and comparative examples was adjusted as shown in Table 1 by adjusting the average grain diameter of the cerium oxide abrasive particles to be used in the end surface polishing. In addition, the bearing factor of a roughness cross-sectional area when the roughness percentage was 60% was adjusted by increasing or decreasing the relative velocity between the glass substrate and the magnets in the polishing conditions for magnetic polishing. The chamfered surfaces and the side wall surfaces of Working Examples 1 to 3 had a maximum height (Rz) of 0.15 μm or less.

It should be noted that the arithmetic average roughness (Ra) and the bearing factor of a roughness cross-sectional area when the roughness percentage was 60% of the chamfered surfaces and the side wall surfaces of the produced magnetic-disk glass substrate were obtained from data that was obtained by measuring the surface shape of an evaluation region of 50 μm square using a laser microscope under the following measurement conditions.

[Laser Microscope]

Resolution: 0.7 nm

Observation power: 1000×

Z axis measurement pitch: 0.1 μm

Cutoff value λs: 0.08 μm

Cutoff value λc: 0.25 mm

A region of 100 μm square on the side wall surface of each magnetic-disk glass substrate of the working examples and comparative examples was observed with a microscope and an SEM, and the number of pieces of foreign matter attached thereto was evaluated. The evaluation criterion is as follows, and the substrates evaluated as "Good" and "Excellent" are acceptable.

[Evaluation Criterion]

Excellent: 0 to 1

Good: 2 to 5

Fair: 6 to 19

Poor: 20 or more

TABLE 1

| | Arithmetic average roughness (Ra) | Bearing factor of roughness cross-sectional area when roughness percentage is 60% | Number of pieces of attaching foreign matter |
|---|---|---|---|
| Comp. Ex. 1 | 0.020 μm | 85% | Poor (42 pieces) |
| Comp. Ex. 2 | 0.014 μm | 93% | Poor (21 pieces) |
| Comp. Ex. 3 | 0.018 μm | 96% | Fair (16 pieces) |
| Work. Ex. 1 | 0.014 μm | 95% | Good (5 pieces) |
| Work. Ex. 2 | 0.010 μm | 96% | Excellent (1 piece) |
| Work. Ex. 3 | 0.009 μm | 97% | Excellent (none) |

As shown in Table 1, it was found that by setting the arithmetic average roughness (Ra) to 0.015 μm or less and the bearing factor of a roughness cross-sectional area when the roughness percentage is 60% to 95% or more in the bearing curve of a roughness cross-sectional area, the evaluation of the number of pieces of foreign matter attached to the surface met the criterion. It is thought that this is because there were very few deep grooves that foreign matter could enter in the measurement region.

Next, by changing the grain size of Fe microparticles serving as a magnetic material as appropriate in the polishing conditions for magnetic polishing while keeping the values of arithmetic average roughness (Ra) and the bearing factor of a roughness cross-sectional area when the roughness percentage was 60% the same as those of Working Example 1, the amount of change in the roughness percentage when the bearing factor of a roughness cross-sectional area increased from 20% to 80% was adjusted as shown in Table 2 (Working Examples 4 to 9). When the number of pieces of foreign matter attaching to each magnetic-disk glass substrate of Working Examples 4 to 9 was evaluated, as shown in Table 2, it is found that the evaluation of the number of pieces of foreign matter attaching thereto became more favorable by setting the amount of change in the roughness percentage to 25% or less when the bearing factor of a roughness cross-sectional area increased from 20% to 80% (Working Examples 7 to 9). It is thought that this is because relatively shallow grooves were formed more uniformly on the side wall surfaces, and thus foreign matter was less likely to remain thereon.

TABLE 2

| | Amount of change in roughness percentage when bearing factor of roughness cross-sectional area increases from 20% to 80% | Number of pieces of attaching foreign matter |
|---|---|---|
| Work. Ex. 4 | 35.0% | Good (5 pieces) |
| Work. Ex. 5 | 30.6% | Good (5 pieces) |
| Work. Ex. 6 | 28.2% | Good (3 pieces) |
| Work. Ex. 7 | 25.0% | Excellent (1 piece) |
| Work. Ex. 8 | 21.6% | Excellent (none) |
| Work. Ex. 9 | 14.8% | Excellent (none) |

Furthermore, magnetic disks in which a magnetic layer and the like on were formed on the obtained magnetic-disk glass substrates of the working examples and comparative examples were produced, and were evaluated by performing LUL endurance testing (600000 times). The LUL endurance testing is a test in which the head is moved back and forth (seek operation) between the position over the ramp and an ID stopper without stopping the motion in a state where the hard disk drive (HDD) including the magnetic disk is placed in a constant temperature and humidity chamber with a temperature of 70° C. and a humidity of 80%, and abnormalities such as dirt and abrasion of the head are checked after the test. After the LUL testing was performed 80,000 times/day×7.5 days=600000 times, the head ABS surface was magnified with a microscope and was visually observed. If the attachment of contaminants, abrasion or chipping was observed, the magnetic disk did not pass the test.

The working examples passed the above-described LUL endurance testing, and the comparative examples did not pass the test. The reason why the comparative examples did not pass the LUL endurance test was that grains were attached between the glass substrate and the magnetic layer, and the grains were found to be colloidal silica microparticles by a composition analysis. That is, it was found that the reason why the comparative examples did not pass the above-described endurance test was that residues of the colloidal silica abrasive particles used in the second polishing were attached to the main surface of the glass substrate. Therefore, it is understood that by causing the side wall surfaces and/or chamfered surfaces to have the surface properties similar to those of the working examples, problems such as head crash and thermal asperity are not likely to occur.

While the magnetic-disk glass substrate according to the present invention has been described in detail, the present invention is not limited to the above-described embodiment, and it will be appreciated that various improvements and modifications can be made without departing from the concept of the present invention.

The invention claimed is:

1. A doughnut-shaped magnetic-disk glass substrate comprising:
    a pair of main surfaces;
    a side wall surface; and
    a chamfered surface between the main surfaces and the side wall surface,
    regarding surface properties of at least one of the side wall surface and the chamfered surface, an arithmetic average roughness being 0.015 µm or less, and a bearing factor of a roughness cross-sectional area being 95% or more when a roughness percentage is 60% in a bearing curve of a roughness cross-sectional area.

2. The magnetic-disk glass substrate according to claim 1, wherein
    regarding the surface properties of at least one of the side wall surface and the chamfered surface, an amount of change in the roughness percentage is 25% or less when the bearing factor of the roughness cross-sectional area increases from 20% to 80% in the bearing curve of the roughness cross-sectional area.

3. The magnetic-disk glass substrate according to claim 1, wherein
    regarding the surface properties of at least one of the side wall surface and the chamfered surface, a maximum height Rz is 0.15 µm or less.

4. The magnetic-disk glass substrate according to claim 1, wherein
    the arithmetic average roughness Ra and/or a maximum height Rz, and the bearing curve of the roughness cross-sectional area, are measured in a region having a predetermined size on the side wall surface and/or the chamfered surface.

5. The magnetic-disk glass substrate according to claim 1, wherein
    at least one of the side wall surface and the chamfered surface is on the outer circumferential side of the glass substrate.

6. The magnetic-disk glass substrate according to claim 5, wherein the surface on the outer circumferential side of the glass substrate is the side wall surface.

7. A magnetic disk in which at least a magnetic recording layer is formed on the surface of the magnetic-disk glass substrate according to claim 1.

8. A method for manufacturing a magnetic-disk glass substrate, the method comprising:
    polishing processing in which a polishing liquid containing polishing abrasive particles is used to perform main surface polishing on a doughnut-shaped glass substrate including a pair of main surfaces, a side wall surface, and a chamfered surface between the main surfaces and the side wall surface,
    regarding surface properties of at least one of the side wall surface and the chamfered surface of the glass substrate, an arithmetic average roughness being 0.015 µm or less, and a bearing factor of a roughness cross-sectional area being 95% or more when a roughness percentage is 60% in a bearing curve of a roughness cross-sectional area.

9. The magnetic-disk glass substrate according to claim 2, wherein
    regarding the surface properties of at least one of the side wall surface and the chamfered surface, a maximum height Rz is 0.15 µm or less.

10. The magnetic-disk glass substrate according to claim 2, wherein
    the arithmetic average roughness Ra and/or a maximum height Rz, and the bearing curve of the roughness cross-sectional area, are measured in a region having a predetermined size on the side wall surface and/or the chamfered surface.

11. The magnetic-disk glass substrate according to claim 3, wherein
    the arithmetic average roughness Ra and/or a maximum height Rz, and the bearing curve of the roughness cross-sectional area, are measured in a region having a predetermined size on the side wall surface and/or the chamfered surface.

12. The magnetic-disk glass substrate according to claim 2, wherein at least one of the side wall surface and the chamfered surface is on the outer circumferential side of the glass substrate.

13. The magnetic-disk glass substrate according to claim 3, wherein
at least one of the side wall surface and the chamfered surface is on the outer circumferential side of the glass substrate.

14. The magnetic-disk glass substrate according to claim 4, wherein
at least one of the side wall surface and the chamfered surface is on the outer circumferential side of the glass substrate.

15. A magnetic disk in which at least a magnetic recording layer is formed on the surface of the magnetic-disk glass substrate according to claim 2.

16. A magnetic disk in which at least a magnetic recording layer is formed on the surface of the magnetic-disk glass substrate according to claim 3.

17. A magnetic disk in which at least a magnetic recording layer is formed on the surface of the magnetic-disk glass substrate according to claim 4.

18. A magnetic disk in which at least a magnetic recording layer is formed on the surface of the magnetic-disk glass substrate according to claim 5.

19. A magnetic disk in which at least a magnetic recording layer is formed on the surface of the magnetic-disk glass substrate according to claim 6.

* * * * *